(12) United States Patent
Shiozawa et al.

(10) Patent No.: US 7,110,471 B2
(45) Date of Patent: Sep. 19, 2006

(54) RADIO COMMUNICATION CONTROL DEVICE WHICH CAN ACCURATELY DETERMINE THE START POINT OF THE STANDBY PERIOD TIMER

(75) Inventors: Tatsuo Shiozawa, Yokohama (JP); Toshio Fujisawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 773 days.

(21) Appl. No.: 10/014,854

(22) Filed: Dec. 14, 2001

(65) Prior Publication Data

US 2003/0063691 A1 Apr. 3, 2003

(30) Foreign Application Priority Data

Sep. 28, 2001 (JP) .............................. 2001-301370

(51) Int. Cl.
*H03K 9/00* (2006.01)
*H04L 7/00* (2006.01)
(52) U.S. Cl. ...................... 375/316; 375/354; 375/356; 375/357
(58) Field of Classification Search ................ 375/316, 375/354, 356, 369, 140, 147; 710/28
See application file for complete search history.

(56) References Cited

U.S. PATENT DOCUMENTS

| 5,668,840 | A | * | 9/1997 | Takano | 375/368 |
| 5,828,663 | A | * | 10/1998 | Ikegami | 370/347 |
| 5,838,748 | A | * | 11/1998 | Nguyen | 375/370 |
| 6,095,632 | A | * | 8/2000 | Kobayashi et al. | 347/23 |
| 6,671,284 | B1 | * | 12/2003 | Yonge et al. | 370/462 |
| 2002/0163933 | A1 | * | 11/2002 | Benveniste | 370/465 |
| 2003/0103521 | A1 | * | 6/2003 | Raphaeli et al. | 370/445 |

OTHER PUBLICATIONS

Broadband Radio Access Networks, HIPERLAN Type 2 Technical Specification Physical layer, pp. 26-28, "Chap. 5, Sec. 8. Radio Transmission", Oct. 1999.

* cited by examiner

*Primary Examiner*—Chieh M. Fan
*Assistant Examiner*—Jason M. Perilla
(74) *Attorney, Agent, or Firm*—Oblon, Spivak, McClelland, Maier & Neustadt, P.C.

(57) ABSTRACT

The demodulation unit demodulates a received signal. The detection circuit detects the final data contained in a received data stream supplied from the demodulation unit. When detecting the final data, the detection circuit outputs the final data notification signal. The standby period timer sets the standby time in accordance with the final data notification signal output from the detection circuit.

11 Claims, 7 Drawing Sheets

RADIO COMMUNICATION CONTROL DEVICE WHICH CAN ACCURATELY DETERMINE THE START POINT OF THE STANDBY PERIOD TIMER

CROSS-REFERENCE TO RELATED APPLICATIONS

This application is based upon and claims the benefit of priority from the prior Japanese Patent Application No. 2001-301370, filed Sep. 28, 2001, the entire contents of which are incorporated herein by reference.

BACKGROUND OF THE INVENTION

1. Field of the Invention

The present invention relates to a radio communication control device applied to, for example, a radio LAN (Local Area Network).

2. Description of the Related Art

In radio data transmission in conformity to standard IEEE802.11, a data communication control device receives transmission data in accordance with the standard defined by IEEE802.11. Then, when the data is judged to be addressed to the self station, the transmission of the data is started after a predetermined standby time period elapses. On the other hand, when it is judged that the data is addressed to some other station, the data transmission must be started after standing by for a predetermined time period different from the above. The start point of the stand-by period timer which initiates to time the stand-by period is set at the finish point of the last received data just before the data transmission. In this operation, it is essential to accurately find the finishing point of the last received data.

For determining the finishing point of the last received data, there are two generally known methods. The first method is of a type in which the intensity of the received electric filed of transmitted data is measured, and when the electric field is detected to become lower than a predetermined threshold value, that particular point is set to be the finishing point of the received data. The second method is of a type in which the medium occupation finishing time is calculated from the timing point when the data communication device receives the last data by its MAC (Media Access Control) layer, in consideration of the processing time in the PHY (Physical) layer.

FIG. 5 is a diagram showing an example of the structure which realizes the first method for measuring the intensity of the received electrical field. With reference to this structure, the first method will now be briefly discussed. That is, a signal received through an antenna 11 is supplied to a synchronizing unit/demodulating unit 13 via a sharing device 12 serving as a transmission/reception switching unit. The received signal is further supplied to an RSSI (Received Signal Strength Indication) processing unit 14. The RSSI processing unit 14 measures the intensity of the electric filed of a received signal, and supplies a control signal to a standby period timer 18 when the intensity of the electrical field thus measured is detected to be lower than a predetermined threshold value. The standby period timer 18 starts counting of the timer in accordance with the control signal and sets the standby period.

Note that a buffer circuit 15, a Viterbi decoder 16, a frame receiver 17, a stand-by period timer 18, a frame outputting unit 19 and a transmitting unit 20 will be described later.

FIG. 6 shows an example indicating the intensity of the electric field of a received signal. According to the first method for measuring the intensity of the electric field of a received signal, the point at which the electric field intensity of the signal shown in FIG. 6 becomes lower than a predetermined threshold value, for example, −40 dBm, is set to be the final point of the occupation of the medium by transmission data. When the electric field intensity of a received signal, measured by the RSSI processing unit 14 is equal to or less than this threshold value, the standby period timer 18 starts counting. However, as shown in FIG. 6, from the burst finishing point of the data part contained in the received signal to the point where the electric filed intensity of the received signal lowers to, for example, −50 dBm, it takes 4 μsec at maximum. This time period differs depending on the received signal, and therefore there results an error of 4 μsec at maximum.

Of standby time periods each between a frame and another frame, defined by IEEE802.11a, the minimum period type is called SIFS (Short Inter Frame Space), and the duration is 16 μsec at maximum. An error of 4 μsec indicates that there may result a maximum of 25% of error with respect to the SIFS. Further, in the case where there is a jamming wave in the electric field of the received signal, the electric field intensity of the received signal does not become lower than the predetermined threshold value, and therefore the operation of the timer cannot be initiated.

As described above, the first method of initiating the timer based on the measurement of the intensity of the electric field of the received signal entails a possible drawback of creating a significant error in determining the starting point of the timer operation, which requires a high precision, and therefore entails such a fatal drawback that once an error occurs, an abnormal communication process lasts forever in the worst case.

On the other hand, FIG. 7 illustrates an example of the structure which can realize the second method described above. In this figure, the same structural parts as those shown in FIG. 5 are designated by the same reference numerals. With reference to the structure shown in this figure, the second method will now be briefly described.

The synchronizing unit/demodulating unit 13 demodulates a signal of a required channel from the received signal, and convert it into a signal of a baseband. Further, the synchronizing unit/demodulating unit 13 detects I and Q signals (not shown) from the baseband signal, and demodulate a symbol of a received data columns from the I and Q signals. Thus, symbols are demodulated one after another, and thus demodulated symbols are supplied to the buffer circuit 15 successively. The Viterbi decoder 16 decodes the symbols stored in the buffer circuit 15. Output data from the Viterbi decoder 16 are supplied to the frame receiving unit 17 in the MAC layer. When the frame receiving unit 17 receives the final received data thus demodulated, the counting of the standby period timer 18 is started.

It should be noted that the second method calculates the medium occupation finishing time from the point when the final received data demodulated in the PHY layer is received by the frame receiving unit 17 of the MAC layer. However, the time required to demodulate received data by the PHY layer differs from a case to another depending on the length of data and the demodulating method. Therefore, it is difficult to calculate the starting point of the standby period in the MAC layer.

In general, the Viterbi decoder 16 decodes symbols in the unit of buffer size. However, the length of received data is variable. Therefore, in some cases, the number of symbols of received data becomes smaller than the size of the buffer circuit at the terminal end, and therefore there is a redundant space created in the buffer circuit 15.

FIG. 8 illustrates buffering operation in the buffer circuit 15.

As shown in this figure, when there is a redundant area results after the final symbol in the buffer circuit 15, the Viterbi decoder 16 is set in such a state that it cannot start the process. In order to avoid this, the PHY layer must carry out a process of inserting particular dummy data in the redundant space of the buffer circuit 15 in order to fill the space. Therefore, even in the same demodulating method, the time of buffering varies depending on the length of data.

Further, the amount of data contained in one symbol is different from one case to another depending on the demodulating method. Therefore, the buffering time varies depending also on the demodulating method.

Further, the length of data is variable and therefore in some cases, there is a gap space created at an end portion of one symbol having a certain length. In this case, the gap space must be filled.

Due to the above three factors combined, the process of the PHY layer becomes very complicated. Therefore, the second method, which calculates the medium occupation fishing time from the point when the MAC layer receives the demodulated final received data from the PHY layer, and sets the starting point of the timer then, becomes very much complicated in structure. As a result, the cost required for the hardware structure for the method is very expensive.

As described above, with the conventionally known first and second methods, it is very difficult to determine the starting point of the standby period timer, which is particularly significant for a radio communication device to control the timing of data transmission.

Under these circumstances, there has been a demand of a radio communication control device which can accurately determine the starting point of the standby period timer without having to provide a complex structure.

BRIEF SUMMARY OF THE INVENTION

According to an aspect of the invention, there is provided a radio communication control device comprising: a demodulation unit configured to demodulate a received signal; a detection circuit configured to detect final data contained in a received data stream supplied from the demodulation unit, the detection circuit outputting a final data notification signal when detecting the final data; and a standby period timer configured to set a standby period in accordance with the final data notification signal output from the detection circuit.

DETAILED DESCRIPTION OF THE INVENTION

An embodiment of the present invention will now be described with reference to accompanying drawings.

Figure 1:
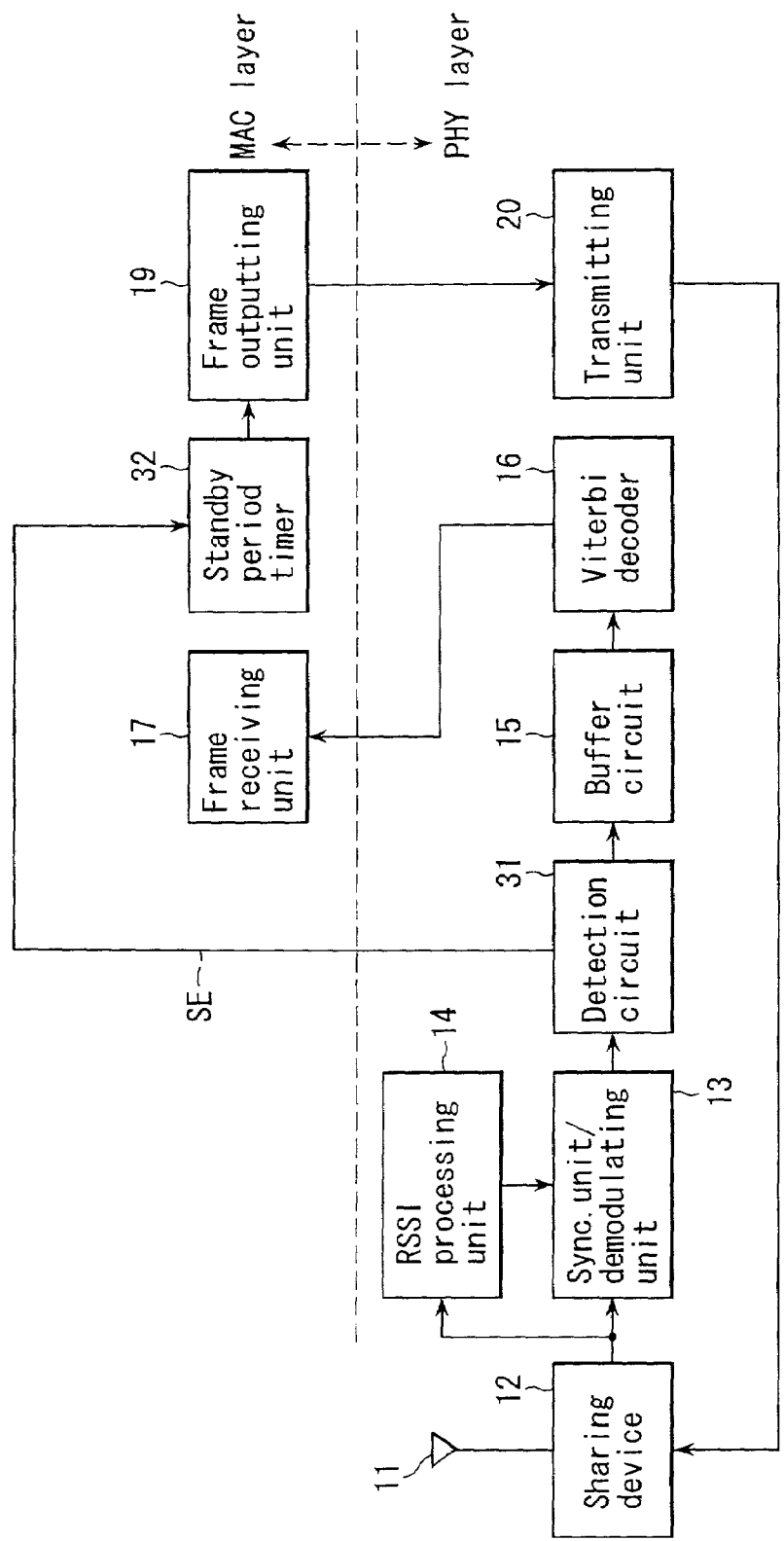
FIG. 1 is a block diagram showing an embodiment of the present invention.
Figure 5:
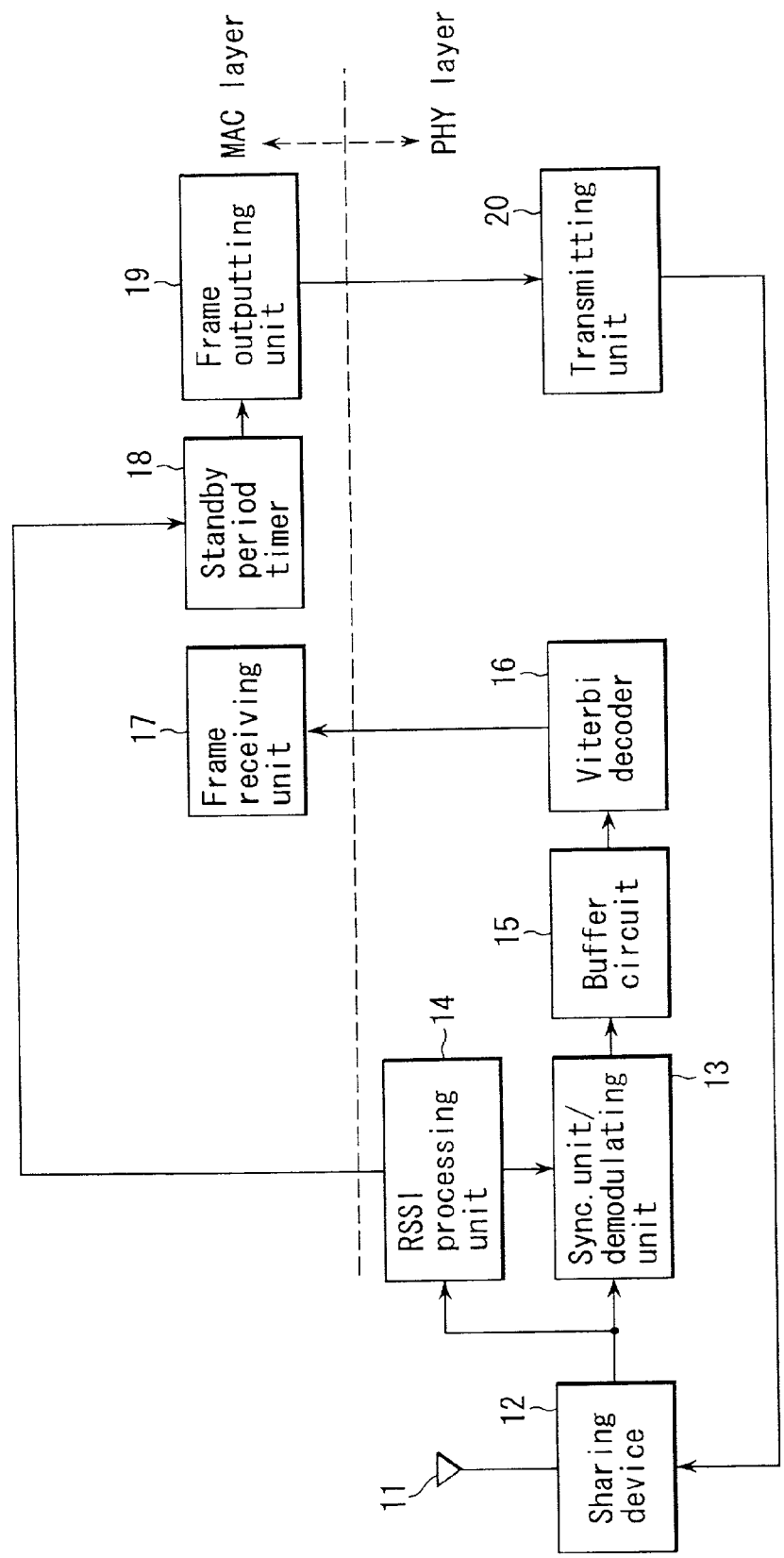
FIG. 5 is a block diagram illustrating an example of the structure which realizes the first method for determining the finishing point of the final received data.
Figure 6:
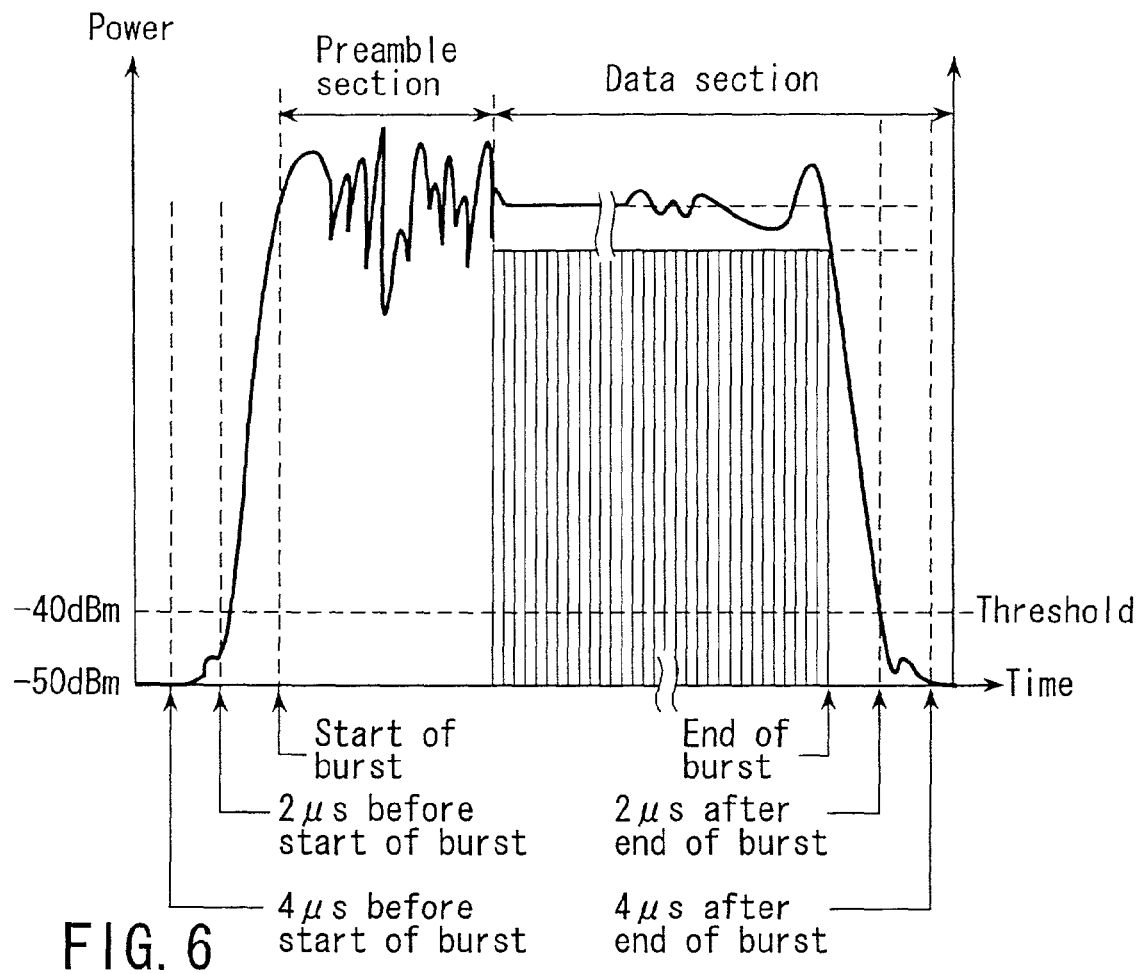
FIG. 6 is a waveform diagram showing an example of the intensity of the electric field of the received signal.
Figure 8:
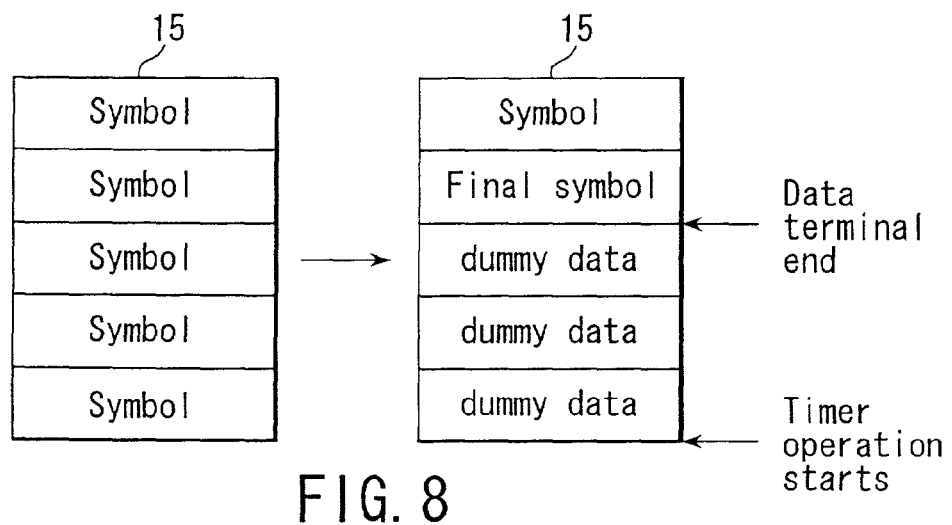
FIG. 8 is a diagram illustrating an operation of the buffer circuit shown in FIG. 7.
Figure 7:
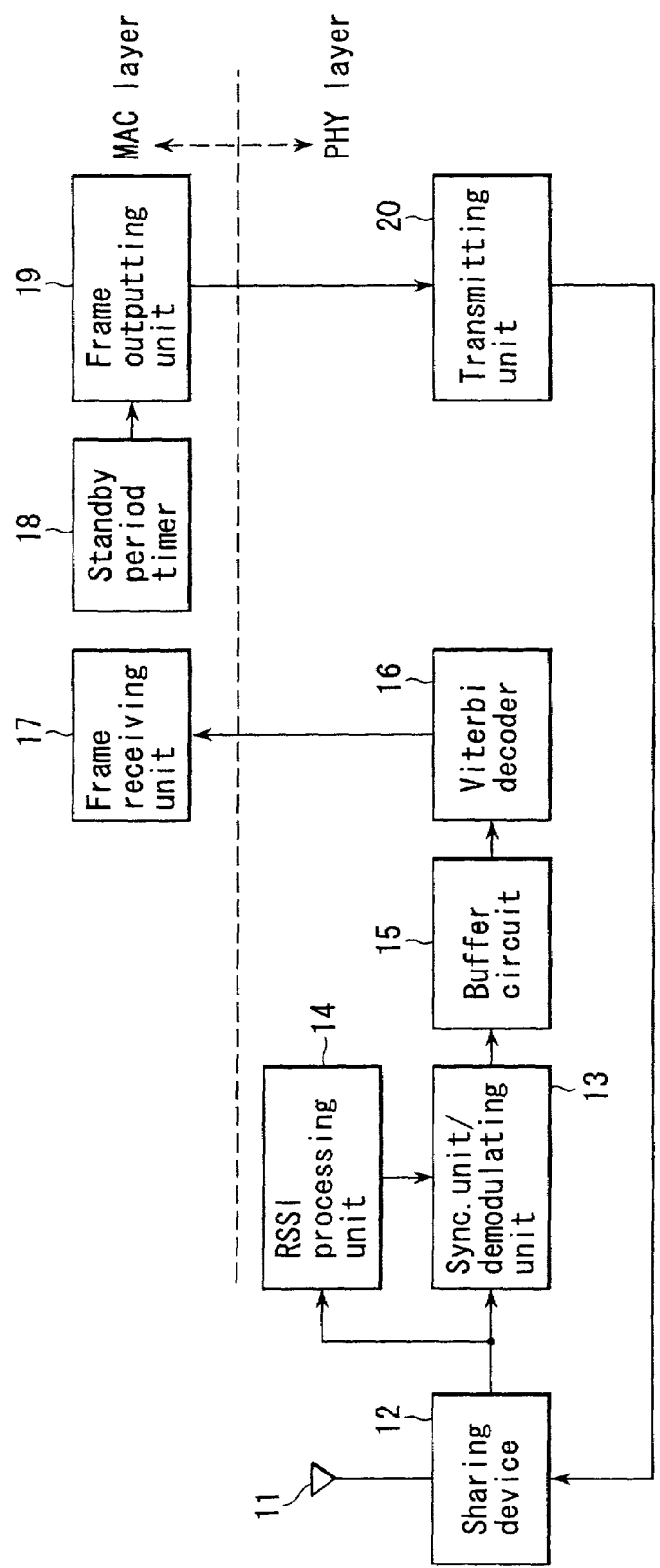
FIG. 7 is a block diagram illustrating an example of the structure which realizes the second method for determining the finishing point of the final received data.

FIG. 1 shows an embodiment of the radio communication control device of the present invention. It should be noted that those structural elements illustrated in this figure, which are similar those shown in FIGS. 5 and 7 are designated by the same reference numerals. A signal received via an antenna 11, that is, for example, an OFDM signal, is supplied to a synchronizing unit/demodulating unit 13 and an RSSI processing unit 14 via a sharing device 12 serving as a transmission/reception switching device. The synchronizing unit/demodulating unit 13 demodulates a signal of a desired channel from the received signal, and converts it into a baseband signal. Further, the synchronizing unit/demodulating unit 13 detects, for example, I and Q signals (not shown) from the baseband signal, and demodulates a symbol of a received data stream from the I and Q signals.

The RSSI processing unit measures the intensity of the electric field of the received signal. The measured received signal electric field intensity is supplied to the synchronizing unit/demodulating unit 13. The synchronizing unit/demodulating unit 13 has an AGC (automatic gain control) circuit at, for example, an IF (intermediate frequency) section. The AGC circuit controls the gain in accordance with the received signal electric field intensity supplied to the AGC circuit.

Between the synchronizing unit/demodulating unit 13 and the buffer circuit 15, the detection circuit 31 is provided. The detection circuit 31 counts the number of symbols in a received data stream. When it is detected that the number of the counts becomes equal to the number of symbols already known, the detection circuit 31 supplies a final symbol notification signal SE to the standby period timer 32 of the MAC layer.

The standby period timer 32 starts the operation in accordance with the final symbol notification signal SE, and measures the actual standby period. When the standby period timer 32 counts up to the predetermined standby period, the transmission data is supplied from the frame outputting unit 19 to the transmitting unit 20. The transmitting unit 20 demodulates transmission data. Thus demodulated transmission data is supplied to the antenna 11 via the sharing device 12, and transmitted from the antenna 11.

Figure 2:
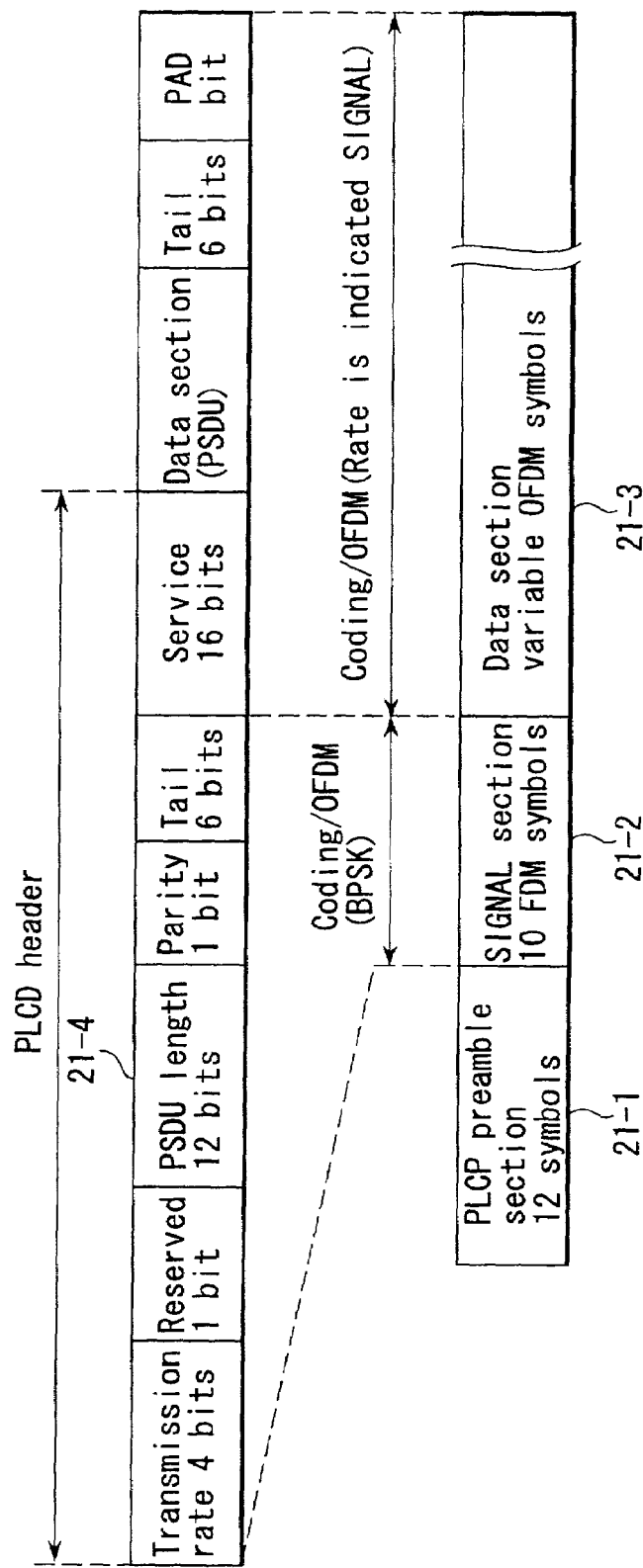
FIG. 2 is a diagram illustrating an example of a packet form of transmission/reception data applied to the embodiment.

FIG. 2 shows an example of a packet form of a transmission/reception data stream applied to this embodiment. As shown in FIG. 2, a packet includes a PLCP (physical layer convergence protocol) preamble section 21-1, a SIGNAL section 21-2, a data section 21-3. Of these, the SIGNAL section 21-2 contains a PSDU (PLCP Service Data Unit) length 21-4 indicating a symbol length of the data section 21-3.

Figure 3:
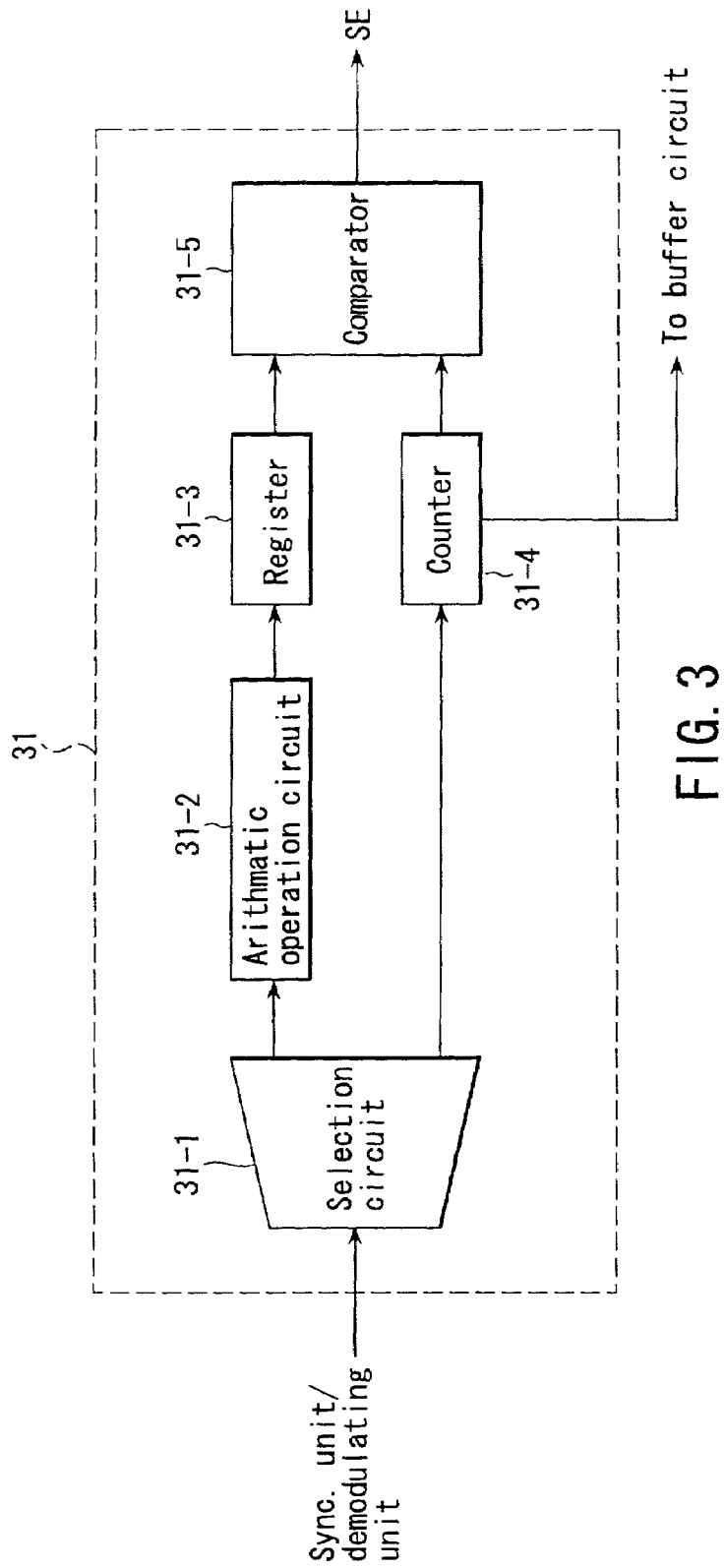
FIG. 3 is a block diagram showing an example of the detection circuit shown in FIG. 1.

FIG. 3 shows an example of the detection circuit 31. The detection circuit 31 includes a selection circuit 31-1, an arithmetic operation circuit 31-2, a register 31-3, a counter 31-4 and a comparator 31-5. To an input terminal of the selection circuit 31-1, received data is supplied to the synchronizing unit/demodulating unit 14. To the first output terminal of the selection circuit 31-1, an input terminal of the register 31-3 is connected via the arithmetic operation circuit 31-2, and to the second output terminal thereof, an input terminal of the counter 31-4 is connected. An output terminals of register 31-3 and counter 31-4 are connected to the comparator 31-5. An output terminal of the comparator 31-5 is connected to the standby period timer 32. Further, data having passed the counter 31-4 are supplied to the buffer circuit 15 and stored therein.

The detection circuit 31 operates in the following manner. The selection circuit 31-1 extracts the PSDU length 21-4 indicating the symbol length of the data section 21-3 shown in FIG. 2, from the received data. The PSDU length 21-4 is supplied to the arithmetic operation circuit 31-2. The arithmetic operation circuit 31-2 calculates the number of symbols from the PSDU length 21-4. The calculated number of symbols is supplied to the register 31-3. The register 31-3 holds the supplied number of symbols. The counter 31-4 counts the number of symbols contained in the received data supplied from the selection circuit 31-1. Then, when it is detected that the symbol number counted by the counter 31-4 becomes equal to the symbol number held in the register 31-3, the comparator 31-5 supplies the final symbol notification signal SE to the standby period timer 32.

Figure 4A:
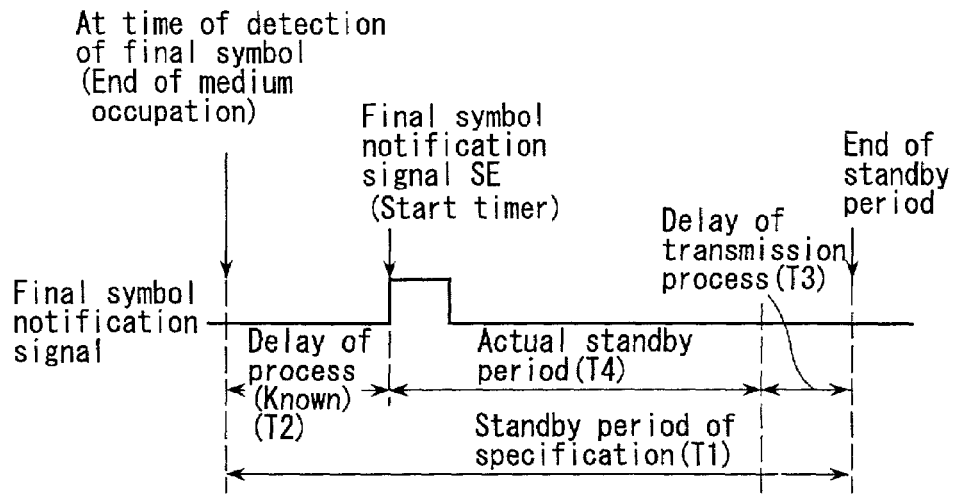
FIG. 4A is a diagram illustrating an operation of the standby period timer.

FIG. 4A illustrates the operation of the standby period timer 32. According to its standard, a standby period T1 starts at the point of the end of occupation of the medium and ends at the finishing of the standby period. A process delay time T2 is a delay time which is required for the process, which starts from the detection of the final symbol (that is, the finishing of the occupation of the medium) to the point when the final symbol notification signal SE is set at a high level (that is, the start of the operation of the standby period timer). The process delay time T2 is the operation time of the detection circuit 31, and therefore it is a known time. Further, a delay time T3 for the frame generation process and the transmission process is a known time. Therefore, when T2 and T3 are subtracted from the standby period T1 of the standard, an actual standby period T4 can be obtained. Therefore, the standby period timer 32 calculates a time equivalent to the actual standby period T4, and starts the frame outputting unit 19 when the standby period T4 elapses.

Figure 4B:
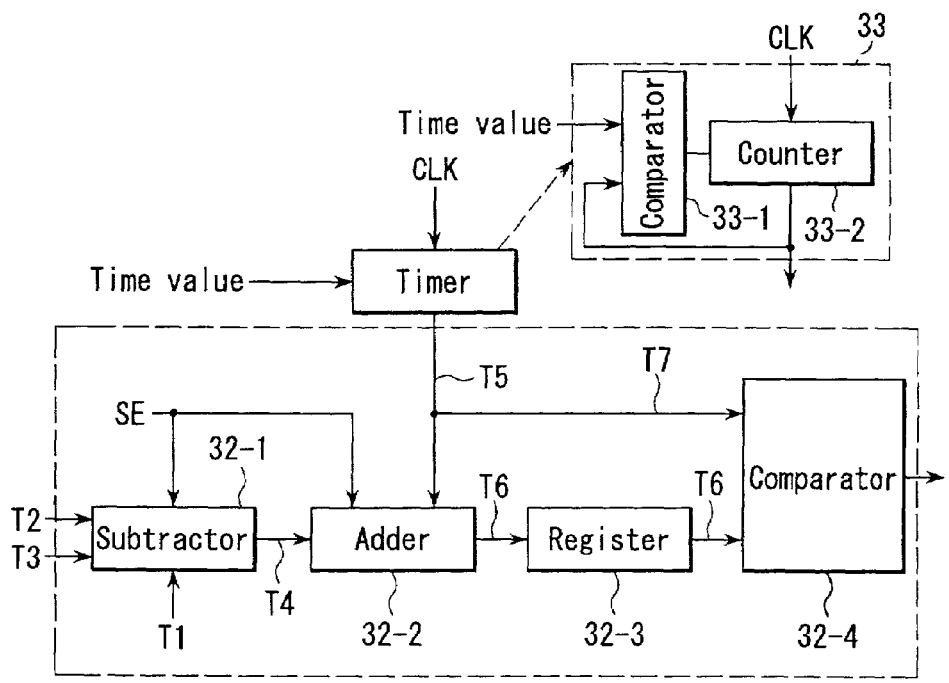
FIG. 4B is a block diagram showing an example of the standby period timer.

FIG. 4B shows an example of the standby period timer 32. The standby period timer 32 includes, for example, a subtracter 32-1, an adder 32-2, a register 32-3, and a comparator 32-4. When the final symbol notification signal SE is received, the subtracter 32-1 subtracts the start delay time T2 and the delay time T3 of the data transmission process from the standby period T1 of the standard. A subtracted value T4 (=T1−T2−T3) outputted from the subtracter 32-1 is supplied to the adder 32-2 together with time data supplied from a timer 33.

The timer 33 is provided in the radio communication control device, and serves as a reference timer which operates in conformity with the standard of IEEE802.11a. The timer 33 measures time on the basis of a clock signal CLK, and is reset to zero when the power of the radio communication device is turned on. Further, this timer 33 includes, for example, the comparator 33-1 and the counter 33-2. The comparator 33-1 compares a time value contained in a frame addressed to the self station received at constant intervals, and a time value measured by the counter 33-2. In the case where the results of the comparison indicates that the time value contained in the received frame is larger than the time value measured by the counter 33-2, the time value of the counter 33-2 is updated by the time value contained in the frame. After that, the counter 33-2 continues the time measurement from the updated time value, which is the new initial value, in accordance with the clock signal CLK.

The adder 32-2 adds up a present time T5 at the point when the final symbol notification signal SE is received, supplied from the timer 33, and a subtracted value T4 (relative value of actual standby period) supplied from the subtracter 32-1. An absolute time T6 of the actual standby period outputted from the adder 32-2 is supplied to the register 32-3. The time T6 held in the register 32-3 is supplied to the comparator 32-4 together with a time T7 outputted from the timer 33. The comparator 32-4 compares the time T6 and time T7 with each other, and when these time values are equal to each other, it outputs a starter signal for starting the frame outputting unit 19.

As described above, the MAC layer sets the point when the final symbol notification signal SE supplied from the PHY layer as the starting point of the standby period timer 32, and further determines a period obtained by subtracting the time actually required for the PHY layer to carry out the process and the delay time of the frame transmitting process, as the actual standby period. When a radio communication device receives data addressed to the self station, the transmission of the frame is started after the standby period, whereas when receiving data addressed to some other station, the frame transmission is delayed further by another standby period.

According to the above-described embodiment, the number of symbols of received data is counted before the buffering prior to the decoding process. Then, the counted symbol number and the known symbol number added to the received data are compared with each other, and at the point of the final symbol, the final symbol notification signal SE is outputted to the MAC layer. With this structure, substantially no error is created in the determination of the starting point of the standby period as compared to the first conventional method which involves the measurement of the electric field intensity of received transmission data.

Further, the second conventional method, which determines the starting point of the timer from a data length and demodulation method at the point when the MAC layer receives final received data, involves complicated calculations. However, as in this embodiment, the PHY detects the final symbol of received data, and notifies this to the MAC layer, and in this manner, the time point of the notification can be set as the starting point of the standby period timer. Therefore, at this time point, the time obtained by subtracting the time required for the PHY layer to carry out the process, which is already known, and the delay time of the frame transmission process from the standby period set by its specification, is determined as the actual standby time period. With this time period thus determined, data can be transmitted at an accurate timing.

Further, in the PHY layer, it is possible to detect the final symbol with a simple structure, and therefore an increase in the scale of the circuit can be avoided.

In addition, according to the above-described embodiment, the actual standby period set by the standby period timer is accurate, and therefore it is possible to transmit an ACK (acknowledgment) frame at an accurate timing. Therefore, a failure in data transmission which is caused by transmission delay of an ACK frame, can be prevented.

Further, the actual standby period set by the standby period timer is accurate, and therefore it is possible to set the data transmission starter timing accurately. Therefore, the problem of becoming disable to carry out data transmission of the self station, which is caused by some other radio communication device having the same specification starting data transmission, can be avoided.

It should be noted that the above embodiment is described in connection with the case where the present invention is applied to the radio communication control device which is in conformity with the standard of IEEE802.11. However, the application of the present invention is not limited to such a device, but can be directed to other type of radio communication control device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication control device comprising:
   a demodulation unit configured to demodulate a received signal;
   a detection circuit, coupled to an output end of the demodulation unit, configured to detect final data contained in a received data stream supplied from the demodulation unit, said detection circuit further configured to output a final data notification signal when detecting the final data; and
   a standby period timer, coupled to an output end of the detection circuit, configured to set a standby period in accordance with the final data notification signal output from said detection circuit,
   wherein the received data stream includes,
   a data section including a plurality of symbols; and
   a symbol length indicating the number of symbols included in the data section,
   wherein said detection circuit includes,
   an arithmetic operation circuit configured to calculate the number of symbols from the symbol length included in the received data stream;
   a register configured to hold the number of symbols supplied from said arithmetic operation circuit;
   a counter configured to count the number of symbols included in the received data stream; and
   a comparator configured to compare the number of symbols counted by the counter and the number of symbols held by the register with each other, said comparator further configured to output the final data notification signal when these numbers coincide with each other, and
   wherein the standby period timer is further configured to subtract a start delay time of the standby period timer and a delay time for a data transmission process from a standby period defined by a specification, in accordance with the final data notification signal, and is configured to obtain an actual standby period.

2. The device according to claim 1, wherein the standby period timer further comprises:
   a subtracter configured to subtract the start delay time of the standby period timer and the delay time for the data transmission process from the standby period defined by the specification, in accordance with the final data notification signal, and to obtain the actual standby period;
   an adder configured to add a present time to the actual standby period supplied from said subtracter; and
   a comparator configured to compare the time outputted from the adder and the present time with each other, said comparator further configured to output a signal when both times coincide with each other.

3. The device according to claim 1, further comprising:
   a buffer circuit connected to an output terminal of the detection circuit, and configured to hold symbols outputted from said detection circuit;
   a Viterbi decoder connected to an output terminal of the buffer circuit, and configured to decode the symbols outputted from said detection circuit, to reproduce a frame; and
   a receiver unit configured to receive the frame outputted from said Viterbi decoder.

4. The device according to claim 1, further comprising:
   a transmitter unit connected to the standby period timer, and configured to transmit a frame in accordance with an output signal of the standby period timer.

5. A radio communication control device comprising:
   a demodulation unit configured to demodulate a received signal;
   a detection circuit, coupled to an output end of the demodulation unit, configured to count the number of symbols contained in a received data stream supplied from said demodulation unit, said detection circuit further configured to output a final data notification signal when the counted number becomes equal to a predetermined symbol number;
   a standby period timer, coupled to an output end of the detection circuit, configured to set a standby period in accordance with the final data notification signal output from said detection circuit,
   wherein the received data stream includes,
   a data section including a plurality of symbols; and
   a symbol length indicating the number of symbols included in the data section,
   wherein said detection circuit includes,
   an arithmetic operation circuit configured to calculate the number of symbols from the symbol length included in the received data stream;
   a register configured to hold the number of symbols supplied from the arithmetic operation circuit;
   a counter configured to count the number of symbols included in the received data stream; and
   a comparator configured to compare the number of symbols counted by the counter and the number of symbols held by the register with each other, said comparator configured to output the final data notification signal when these numbers coincide with each other, and
   wherein the standby period timer is configured to subtract a start delay time of the standby period timer and a delay time for a data transmission process from a standby period defined by a specification, in accordance with the final data notification signal, and configured to obtain an actual standby period.

6. The device according to claim 5, wherein the standby period timer further comprises:
   a subtracter configured to subtract the start delay time of the standby period timer and the delay time for the data transmission process from the standby period defined by the specification, in accordance with the final data notification signal, and to obtain the actual standby period;

an adder configured to add a present time to the actual standby period supplied from the subtracter; and a comparator configured to compare the time outputted from the adder and the present time with each other, the comparator further configured to output a signal when both times coincide with each other.

7. The device according to claim 5, further comprising:

a buffer circuit connected to an output terminal of the detection circuit, and configured to hold symbols outputted from the detection circuit;

a Viterbi decoder connected to an output terminal of the buffer circuit, and configured to decode the symbols outputted from the detection circuit, to reproduce a frame; and a receiver unit configured to receive the frame outputted from the Viterbi decoder.

8. The device according to claim 5, further comprising:

a transmitter unit connected to the standby period timer, and configured to transmit a frame in accordance with an output signal of the standby period timer.

9. A radio communication control device which starts data transmission when a predetermined time elapses after reception of transmission data, said device comprising:

a demodulation unit configured to demodulate a received signal;

a detection circuit, coupled to an output end of the demodulation unit, configured to count the number of symbols contained in a received data stream supplied from said demodulation unit, said detection circuit further configured to output a final data notification signal when the counted number becomes equal to a predetermined symbol number;

a standby period timer, coupled to an output end of the detection circuit, configured to set a standby period in accordance with the final data notification signal output from said detection circuit, wherein the received data stream includes, a data section including a plurality of symbols; and a symbol length indicating the number of symbols included in the data section, wherein said detection circuit includes, an arithmetic operation circuit configured to calculate the number of symbols from the symbol length included in the received data stream;

a register configured to hold the number of symbols supplied from the arithmetic operation circuit;

a counter configured to count the number of symbols included in the received data stream; and a comparator configured to compare the number of symbols counted by the counter and the number of symbols held by the register with each other, said comparator further configured to output the final data notification signal when these numbers coincide with each other, and wherein the standby period timer is configured to subtract a start delay time of the standby period timer and a delay time for a data transmission process from a standby period defined by a specification, in accordance with the final data notification signal, and is configured to obtain an actual standby period.

10. The device according to claim 9, wherein the standby period timer further comprises:

a subtracter configured to subtract the start delay time of the standby period timer and the delay time for the data transmission process from the standby period defined by the specification, in accordance with the final data notification signal, and to obtain the actual standby period;

an adder configured to add a present time to the actual standby period supplied from the subtracter; and a comparator configured to compare the time outputted from the adder and the present time with each other, the comparator further configured to output a signal when both times coincide with each other.

11. The device according to claim 9, further comprising:

a buffer circuit connected to an output terminal of the detection circuit, and configured to hold symbols outputted from the detection circuit;

a Viterbi decoder connected to an output terminal of the buffer circuit, and configured to decode the symbols outputted from the detection circuit, to reproduce a frame; and a frame receiver unit configured to receive the frame outputted from the Viterbi decoder.

* * * * *